(12) United States Patent
Moore et al.

(10) Patent No.: US 8,266,237 B2
(45) Date of Patent: Sep. 11, 2012

(54) SYSTEMS AND METHODS FOR PROVIDING DISTRIBUTED, DECENTRALIZED DATA STORAGE AND RETRIEVAL

(75) Inventors: George M. Moore, Issaquah, WA (US); Istvan Cseri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

(21) Appl. No.: 11/110,128

(22) Filed: Apr. 20, 2005

(65) Prior Publication Data

US 2006/0242155 A1 Oct. 26, 2006

(51) Int. Cl.
*G06F 15/167* (2006.01)
*G06F 15/16* (2006.01)
*G06F 13/00* (2006.01)

(52) U.S. Cl. .......................... 709/213; 709/231; 711/112
(58) Field of Classification Search .................. 709/213, 709/219, 225, 231, 232, 226; 711/112
See application file for complete search history.

(56) References Cited

U.S. PATENT DOCUMENTS

| | | | |
|---|---|---|---|
| 5,717,535 A * | 2/1998 | French et al. .................... | 360/53 |
| 5,948,062 A | 9/1999 | Tzelnic et al. | |
| 5,966,120 A * | 10/1999 | Arazi et al. .................... | 715/724 |
| 6,292,483 B1 | 9/2001 | Kerstein | |
| 6,732,162 B1 | 5/2004 | Wood et al. .................... | 709/219 |
| 7,328,303 B1 * | 2/2008 | Waterhouse et al. .......... | 711/112 |
| 7,555,527 B1 | 6/2009 | Slaughter et al. | |
| 2002/0114341 A1 | 8/2002 | Sutherland et al. | |
| 2002/0147815 A1 * | 10/2002 | Tormasov et al. ............. | 709/226 |
| 2003/0028517 A1 * | 2/2003 | Nakano et al. ..................... | 707/1 |
| 2003/0063770 A1 | 4/2003 | Svendsen et al. ............. | 382/100 |
| 2003/0084020 A1 * | 5/2003 | Shu ..................................... | 707/1 |
| 2003/0105831 A1 | 6/2003 | O'Kane ......................... | 709/217 |
| 2003/0114341 A1 | 6/2003 | Liu ................................. | 510/384 |
| 2003/0154238 A1 | 8/2003 | Murphy et al. ................ | 709/201 |
| 2003/0158958 A1 | 8/2003 | Chiu .............................. | 709/231 |
| 2003/0177435 A1 * | 9/2003 | Budd et al. .................... | 714/776 |
| 2003/0233609 A1 * | 12/2003 | Ikonomopoulos et al. ... | 714/758 |
| 2004/0064633 A1 * | 4/2004 | Oota .............................. | 711/100 |
| 2004/0117549 A1 * | 6/2004 | Nakamura ..................... | 711/114 |
| 2005/0004995 A1 | 1/2005 | Stochosky ..................... | 709/219 |
| 2005/0050292 A1 * | 3/2005 | Oh ................................. | 711/170 |
| 2005/0078601 A1 | 4/2005 | Moll et al. | |
| 2006/0116117 A1 * | 6/2006 | Takase et al. ................. | 455/420 |

FOREIGN PATENT DOCUMENTS

| | | |
|---|---|---|
| JP | 2004-126716 A | 4/2004 |
| JP | 2004-221756 A | 8/2004 |
| JP | 2005-70987 A | 3/2005 |
| WO | WO 01/10125 A1 | 2/2001 |

OTHER PUBLICATIONS

"Past: A Large-Scale, Peer-to-Peer Archival Storage Facility", http://www.research.microsoft.com, Turning Ideas into Reality, Microsoft Research home Page, Apr. 20, 2005, 2 pages.

(Continued)

*Primary Examiner* — Boris Gorney
(74) *Attorney, Agent, or Firm* — Woodcock Washburn LLP

(57) ABSTRACT

Systems and methods for distributed, decentralized storage and retrieval of data in an extensible SOAP environment are disclosed. Such systems and methods decentralize not only the bandwidth required for data storage and retrieval, but also the computational requirements. Accordingly, such systems and methods alleviate the need for one node to do all the storage and retrieval processing, and no single node is required to send or receive all the data.

7 Claims, 4 Drawing Sheets

OTHER PUBLICATIONS

Google: AdSense, www.google.com/adsense, Home page, Apr. 20, 2005, 2 pages.
Picasa 2, www.picasa.com, Home page, Apr. 20, 2005, 1 page.
"Mediated Peer-to-Peer Networking-An Effective Vehicle for delivering Rich-Meida Content", www.wwpi.com, Apr. 20, 2005, 2 pages.
EP Application No. 06737790: Extended European Search Report, Aug. 30, 2010, 5 pages.
PCT Application No. PCT/US2006/08647: International Search Report and Written Opinion of the International Searching Authority, Oct. 19, 2007, 7 pages.
Kobatake et al., "An Efficient Technique for Processing Compound Queries on DHT-based P2P Systems", Technical Report of IEICE, The Institute of Electronics Information and Communication Engineers, Japan, Dec. 9, 2004, 104(513), 7-12.

* cited by examiner

SYSTEMS AND METHODS FOR PROVIDING DISTRIBUTED, DECENTRALIZED DATA STORAGE AND RETRIEVAL

FIELD OF THE INVENTION

The invention relates generally to systems and methods for providing distributed, decentralized data storage and retrieval. More particularly, the invention relates to distributed storage and retrieval models that provide cost-effective mechanisms to enable peer-based services such as, for example, rich media advertising, photo and video sharing and storage, and video email.

BACKGROUND OF THE INVENTION

A number of scenarios may be enabled via a peer-based, distributed storage system. Examples of such scenarios include peer-based textual and rich media advertising storage/caching/replication, peer-based digital photo and video storage and sharing, and peer-based video email. These scenarios tend to be cost prohibitive as centralized services, however, because storage costs can become unbounded in a data center.

Many websites are moving to purely advertising-based models with highly targeted advertisements that appear based upon knowledge previously learned from the user. For example, it is well-known that a great deal of demographic data can be collected about people, and quite a bit of information can be inferred based solely upon data collected in the clickstream of a website. Highly targeted ads may be based upon search keywords, for example. Such a scenario typically requires lots of storage.

Storage of such advertisements in a centralized manner has been done before. A difficulty, however, exists in certain markets, such as emerging markets, because a different cost structure may be needed to be able to efficiently store, forward, and cache the advertisements to the local machine. In many cases, it is cost prohibitive to centralize these ads and pay storage costs in a datacenter because the ads are generally localized into the various world-wide markets. Paying bandwidth costs to ship ads around the world is usually not an efficient or inexpensive model.

Existing solutions for photo sharing fall into two major camps: centralized storage (e.g., photos.msn.com) or point-to-point ("P2P") photo sharing (e.g., Google's current version of "Picasa"). Centralized storage has clear limitations: if it is provided for free, the total space available for photo storage may be severely limited. On the other hand, typical user fees tend to be far in excess of what it would cost a user to simply buy their own disk. If they buy their own disk, however, then they are responsible for backing up the photos and may be severely limited in the number of people who could view the photos because most broadband connections throttle the upload speeds.

P2P photo sharing solutions, such as Groove or Google's current version of Picasa, make entire copies of the photos across all of the machines participating in a peer group. Though this sidesteps the storage cost and bandwidth issues described above, it introduces different problems. For example, if not many people are participating in the group, then there is a fair chance (depending upon the uptime of the various peers) that a participant's photos may not be available if their local copies were lost. In addition, this brute force solution requires 100% of all peers to store 100% of all photos. This tends to result in a great deal of redundant storage used across the entire peer group, and does not scale well.

Video messages delivered via email suffer from many of the same problems described above in connection with photo sharing, but they are even more massive in size (making storage costly). Delivery also tends to be unreliable, unless serviced from a central datacenter. Though live P2P video teleconferencing does not have the storage problems (because the video is consumed at the same time it is sent), it has further limitations around quality (limited by bandwidth) as well as synchronicity of the speaking parties.

Thus, there is a need in the art for distributed storage models that provide cost-effective mechanisms to enable peer-based services such as rich media advertising, photo/video sharing/storage, and video email, for example.

SUMMARY OF THE INVENTION

The invention provides systems and methods for decentralized, distributed data storage and retrieval. Such a system may include an interconnected network of nodes. Each node may have running thereon a collection of one or more processes that form a "local cache and transport layer," a "stream store layer," a "chunk store layer," and a "fragment store layer." A collection of processes may also be provided for "block" storage.

The local cache and transport layer may include a storage service and a routing service. The storage service may receive a storage request to store a certain bit stream of arbitrary length. The routing service may communicate the bit stream to any of the stream store services. The stream store service may store the bit stream in local persistent storage for later retrieval, and also divide the bit stream into one or more "chunks." The stream store service may then communicate the chunks to respective chunk store services. The chunk store service may store the chunk in local persistent storage for later retrieval, and also divide the chunk into one or more "fragments." The chunk store service may then encode the fragments into check blocks and communicate them to respective fragment store services. The fragment store service may store the fragment in local persistent storage for later retrieval. Thus, the bit stream may be divided into a plurality of check blocks, and each check block stored, in general, on a different network node distributed over a vast network of such nodes.

Such a decentralized, peer-to-peer, distributed storage system may be used to store and cache digital advertisements locally, such as, for example, in client PCs that reside in the actual country or city where the ads are to be viewed. With regard to digital photo and video storage and sharing, the underlying distributed storage mechanisms may be leveraged to achieve very high reliability and availability of the photos without requiring massive amounts of redundancy. With regard to video email, the distributed storage model may be leveraged to build a reliable mail delivery system tuned for large-sized video messages.

DETAILED DESCRIPTION OF ILLUSTRATIVE EMBODIMENTS

Example Computing Environment

Figure 1:
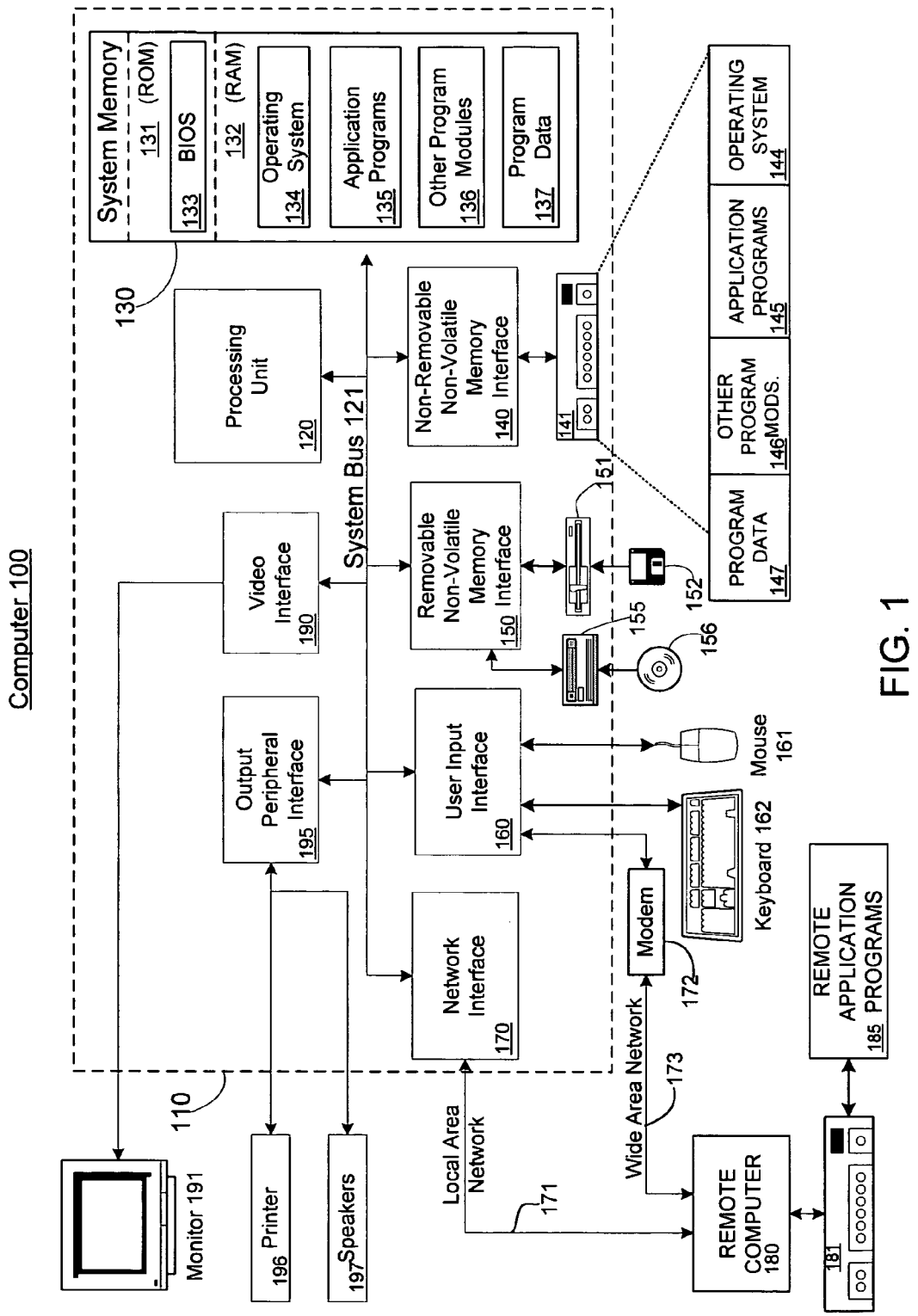
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Distributed Network

Figure 2:
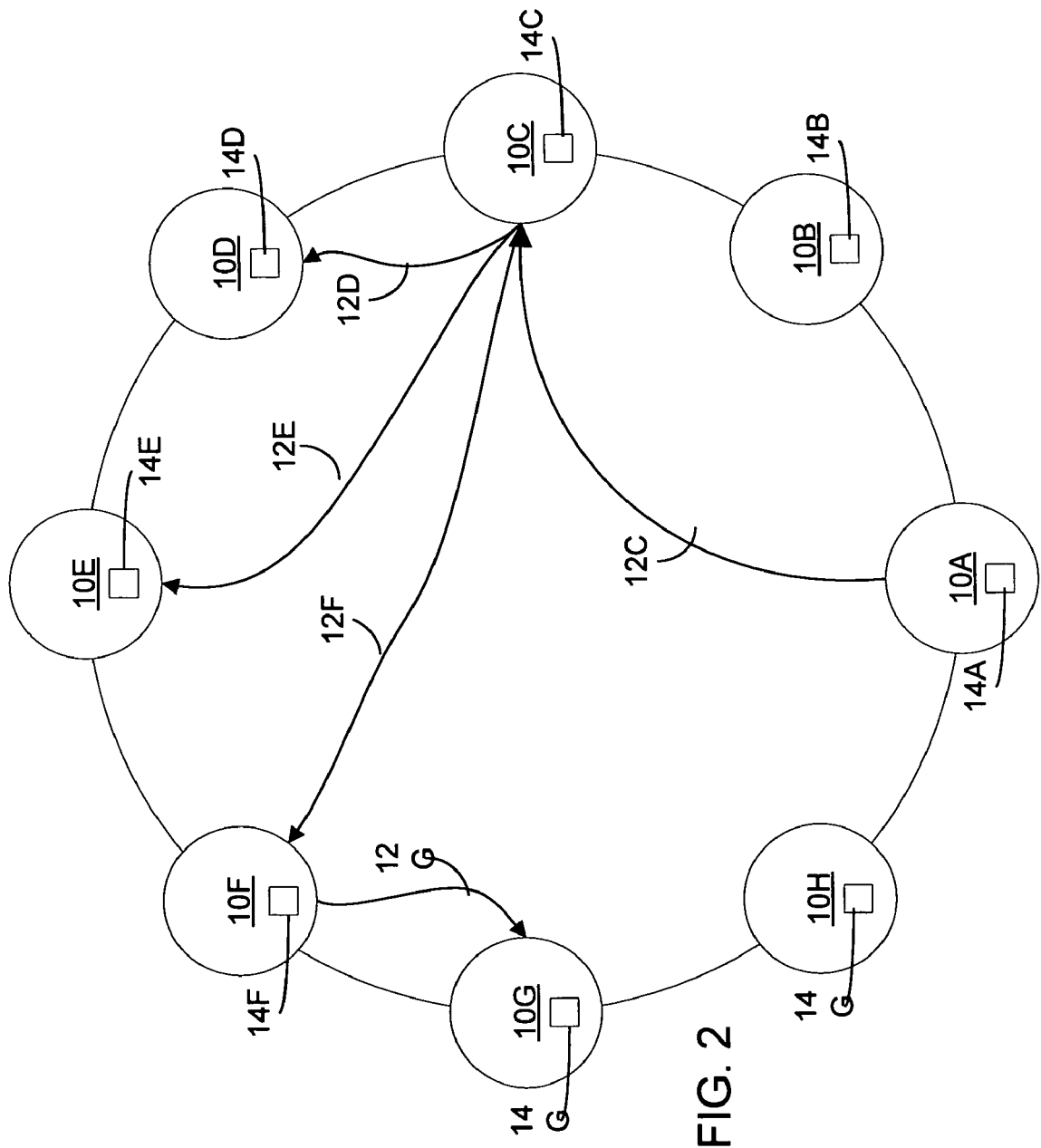
FIG. 2 depicts an example of a distributed network.

FIG. 2 depicts an example of a distributed network comprising a plurality of network nodes 10A-H. Such a node may be a personal computer, for example, or any other network device that includes processing and data storage capabilities, such as, for example, a server, a router, a network PC, a peer device, etc. The nodes 10A-H may be peers that are interconnected to one another over a local- or wide-area-network such as an intranet or the Internet, for example.

Each node 10A-H may be assigned a unique address. The length of the address may be chosen in order to ensure that each node has a unique address. In an example, Interned-based system, where the network is expected to include tens of millions of nodes, 160-bit addresses may be used. Such an addressing scheme may form a routing overlay on top of the TCP.

Processes distributed among the several nodes 10A-H may communicate with each other over the network via simple object access protocol ("SOAP") messages. SOAP is a well-known, lightweight, XML-based distributed computing protocol. A SOAP message is an XML document that includes a SOAP envelope. The envelope includes an optional SOAP header and a mandatory SOAP body. The SOAP message header represents the metadata of the message and provides a way to extend SOAP. The SOAP message body is the actual message payload. The distributed processes may communicate with one another by putting SOAP packets onto the network.

A process may be a message originator (e.g., on node 10A as shown), an intended message receiver (e.g., on node 10G as shown), or an intermediary (e.g., on node 10C as shown). The message originator is the process that originally puts the SOAP message onto the network. The intended message receiver is the process to which the message is ultimately destined. Accordingly, a SOAP message originating from the message originator may include an address associated with the intended message receiver.

It is possible, however, especially in large networks, that the message originator does not know the address of the intended message receiver. In fact, the message originator might not even know that the intended message receiver exists. Accordingly, to get the message to the intended receiver (on 10G), a process on an intermediary node (10C) may receive the message (12C), modify and/or copy the message, and put one or more copies (12D-F) of the message back onto the network. Thus, the message may "hop" around the network until the message (12G) eventually hops to the intended message receiver (on 10G). It has been found that, for a network having about 10 million nodes, the average hop count is about three, and the maximum hop count is about 5.8.

In order to optimize the number of hops it takes to get a message from the originator to the intended message receiver, the nodes may "gossip." That is, from time to time, nodes may communicate information about themselves onto the network. For example, a node may gossip about its up-time or bandwidth and the status of its neighbors. Nodes also listen for such information being communicated by their neighbors. Consequently, each node learns, and retains information, about certain of its peers.

Such gossiping enables a message originator to get a message to an intended message receiver without specific knowledge of the intended message receiver's address. For example, if the message originator wants to get a message to a certain device, then the message originator need only get the message as close to that device as possible (e.g., address it to another node that is likely to know something about the intended message receiver, or something about another node that is likely to know something about the intended message receiver, etc.). Because the neighbors of the intended message receiver will have knowledge of the intended message receiver, the message will eventually hop to the intended message receiver. Thus, a resilient network may be built that enables message delivery even where, for example, the message originator does not know how to get to the intended message recipient directly, or cannot get to the intended message recipient directly because of a firewall, for example, or the like.

A service on each node 10A-H may also maintain a local routing table 14A-H on behalf of one or more neighboring nodes. Local routing tables are described in greater detail below.

Systems and Methods for Distributed Data Storage

Figure 3A:
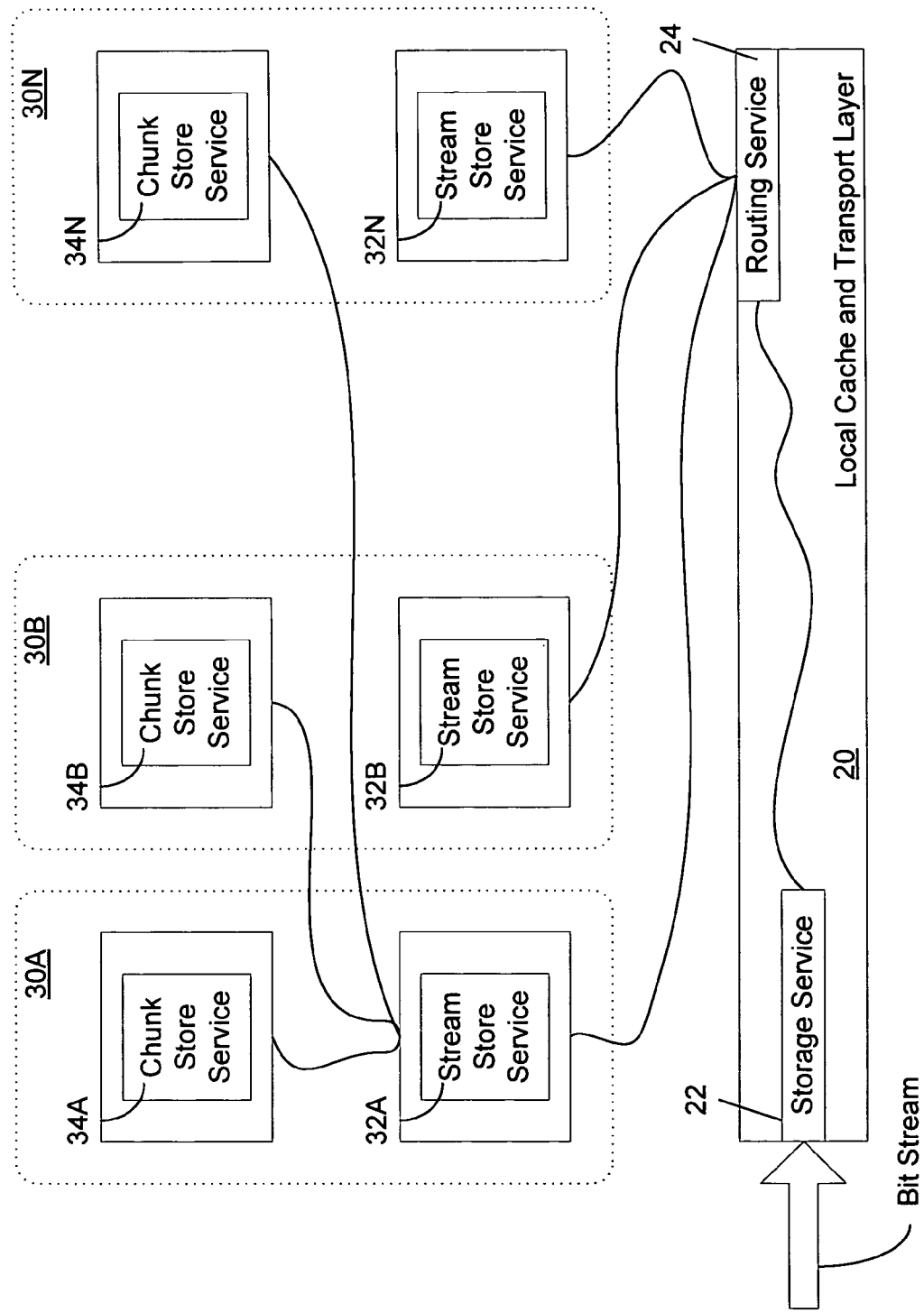
FIGS. 3A and 3B depict an example distributed storage system.
Figure 3B:
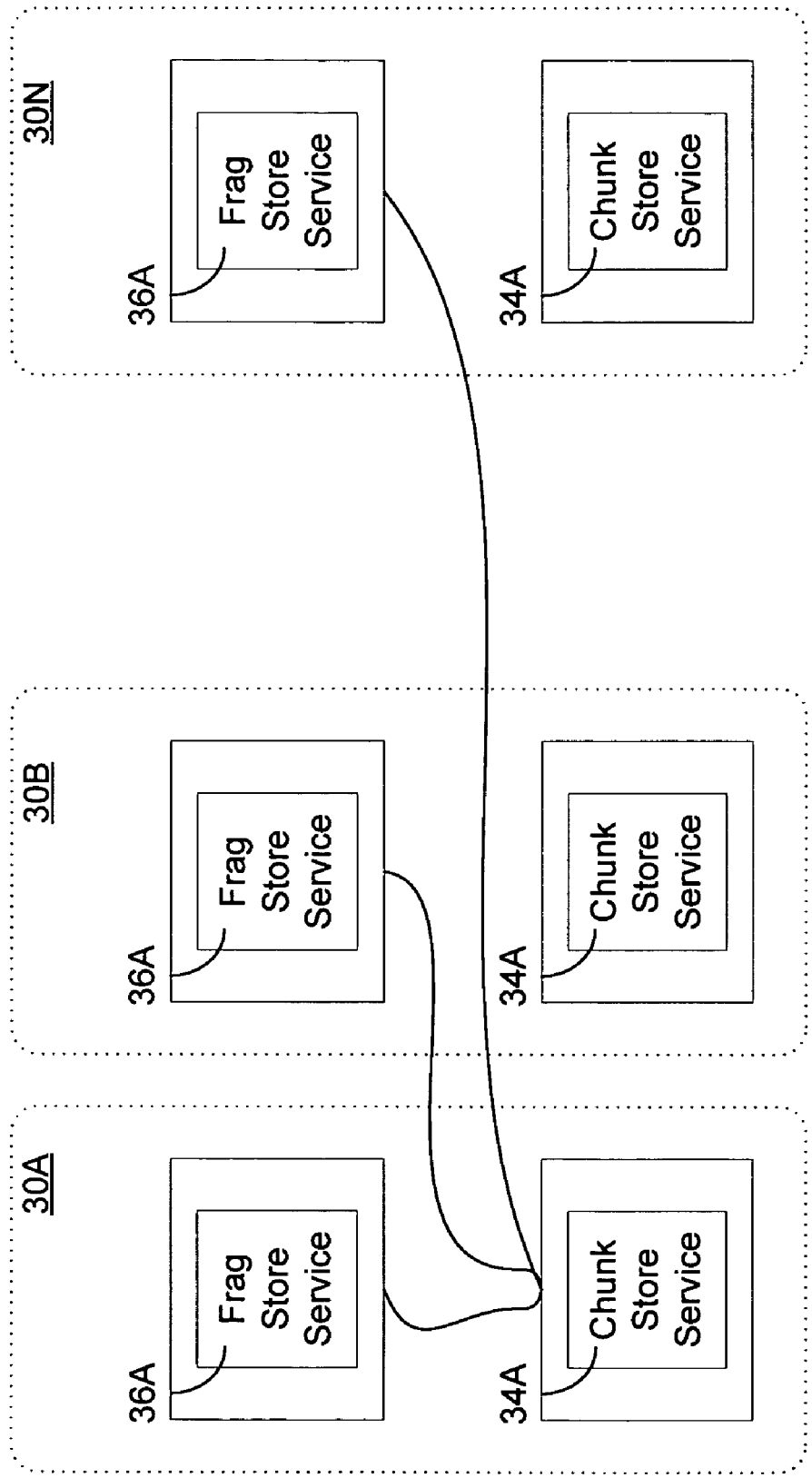

FIGS. 3A and 3B depict an example system for distributed data storage. As shown, such a system may include an interconnected network of nodes (e.g., 30A, 30B, . . . 30N), such as described above. Each node 30A-N may have any number of processes running thereon. For example, each node 30A-N may have a collection of one or more processes that form a "local cache and transport layer," 20 a collection of processes that form a "stream store layer," 32 a collection of processes that form a "chunk store layer," 34 and a collection of processes that form a "fragment store layer," 36. A collection of processes (not shown) may also be included for check block storage.

The local cache and transport layer 20 may include a storage service 22 and a routing service 24. The storage service 22 and the routing service 24 may reside on the same node or on different nodes. The storage service 22 may receive a storage request (Bit Stream) from the same node or from a different node via the network. The storage request may include a request to store a certain bit stream. Such a bit stream may, in general, have any arbitrary length M. The routing service 24 may communicate the bit stream to any of the one or more stream storage services 32A-N. The stream storage service that receives the bit stream may reside on the same node as the routing service, or on a different node.

The stream store service at the recipient node (32A, as shown) may receive one or more packets containing the bit stream (i.e., the bit stream may be so long that more than one packet is required to communicate it to the stream store service). The stream store service 32A may store the bit stream in local persistent storage for later retrieval. The stream store service 32A may also divide the bit stream into one or more "chunks." Each chunk may be of length $m \leq M$ bits. In an example embodiment, each chunk may have a length of about 64K bits. The stream store service 32A may then communicate each of the one or more chunks to respective chunk store services 34A-N. A chunk store service that receives a chunk may reside on the same node as the stream store service 32A, or on a different node.

The chunk store service at the recipient node (34A, as shown) may receive one or more packets containing the chunk and may store the chunk in local persistent storage for later retrieval. The chunk store service 34A may also divide the chunk into one or more "fragments." Each fragment may be of length $1 \leq m$ bits. In an example embodiment, each fragment may have a length of about 2K bits. The chunk store service 34A may then encode the fragments into check blocks and communicate each of the one or more check blocks to respective fragment store services 36A-N. A fragment store service that receives a fragment may reside on the same node as the chunk store service 34A, or on a different node.

The fragment store service at the recipient node (36A, as shown) may receive one or more packets containing the fragment, and may store the fragment in local persistent storage for later retrieval. The fragment store services 36A-N at the recipient nodes may receive one or more packets containing the respective check blocks, and each may store a respective check block in local persistent storage for later retrieval. Thus, the M-bit bit stream may be divided into a plurality of k-bit check blocks, and each check block stored, in general, on a different network node distributed over a vast network of such nodes.

Preferably, the number of check blocks into which each chunk is divided is more than enough to ensure reliable retrieval with a great degree of confidence. Any of a number of known algorithms may be employed for determining the number of check blocks that should be stored to ensure, with a certain confidence level, that the original bit stream may be reconstructed from the check blocks. Such algorithms are known to those skilled in the art, and therefore, need not be described in detail here.

In order to ensure that the data retrieval system (described below) will be able to find the stored data later, an addressing scheme may be used to determine where (i.e., on which nodes) to store the data. The routing service, for example, may compute, based on the bit stream itself, an address of a node to which to route the bit stream. For example, in a scenario such as described above where each node may be identified by a unique address, a hash may be computed based on the bit stream and a hash table may be consulted to determine a node address that corresponds to the hash value.

The bit stream may have a bit stream identifier. For example, the bit stream may be a file; the file may have a file name. Accordingly, the file name may be considered a bit stream identifier. The user (i.e., the person seeking to store the bit stream) may have a user identifier. For example, there may be a public key associated with the user. In an example embodiment, the bit stream identifier and the user identifier may be concatenated, and a hash of the concatenated string computed. The computed hash value may be used to determine the address of the node to which the bit stream is to be sent for storage and subsequent storage processing as described above. Similarly, a respective hash value may be computed for each chunk, fragment and check block into which the bit stream is decomposed. The chunks, fragments, and check blocks may then be sent to the nodes having addresses that correspond to the computed hash values.

In a network environment having millions of nodes, it may be impractical (and undesirable) for each node to store and maintain a hash table that includes a respective address associated with every node. Accordingly, in an example embodiment, a service on each node 10A-H may maintain a local routing table 14A-H on behalf of one or more neighboring nodes (see FIG. 2). Preferably, every node knows about the address space (i.e., the addressing scheme used to uniquely identify the several nodes), but each node maintains a routing table only for a few of its neighbors. Thus, the hash table may be distributed among the several nodes.

By using a distributed hash table, each node has insight into only a small portion of the entire address space. As described above, however, it is the nature of the underlying fabric that a message originator need not know the address of the intended receiver. The message originator can compute a hash base on the bit stream (or chunk or fragment or block) to be stored, and consult its local hash table. If the address is found, then the message originator can send the message directly to the intended receiver. Otherwise, the message originator puts the message onto the fabric, and the message hops through one or more intermediaries until it finds its way to the intended receiver.

Eventually, as described above, the data (e.g., check block, fragment, chunk, or bit stream) is persisted (i.e., stored permanently in storage) at a destination node. When the data is persisted, the destination node may put a message onto the fabric to inform the originating node that the data has been persisted. When the originating node receives the information message, it accepts that the data has been persisted.

For example, when a check block is persisted on a destination node, the fragment store service may notify the chunk store service that requested storage of the check block that the check block has been persisted. Similarly, when all the check blocks associated with a given chunk are persisted, the chunk store service may notify the stream store service that requested storage of the chunk that the chunk has been persisted, etc. Eventually, the routing service at the local cache and transport layer is notified that the bit stream has been stored.

In order to confirm that storage has occurred properly, the service requesting storage may start a timer when the data is sent out for storage. For example, when a chunk store service sends out its fragments for storage, the chunk store service may start a fragment storage confirmation timer. If the chunk store service does not receive confirmation that a particular fragment has been stored before the timer expires, then the chunk store service concludes that the fragment has not been stored, and attempts to store the fragment elsewhere.

It should be understood, however, that a distributed system as described above may have the capability to "alter" time. That is, each node may have a time manager that keeps time for that node relative to absolute system time. Thus, time may be slowed, stopped, or even reversed on a particular node relative to absolute system time and to the time frame of other nodes. Accordingly, because time at the node requesting storage may be running faster than time at the node(s) on which the data is to be stored (or intermediary nodes), the timer at the node requesting storage may expire before the data is persisted, even though there is nothing wrong with the storage process—time is merely running slower. To accommodate for this, the storing node can, periodically, send a message to the node requesting storage to inform the node requesting storage that, even though storage is not yet completed, the node requesting storage should not time out.

In order to retrieve the bit stream (or, as described below, a portion of the bit stream), the routing service 24 in the local cache and transport layer 20 may put a message onto the network requesting that the data be retrieved from the node(s) on which it is stored. To retrieve the data, the routing service 24 may compute the key associated with the data. For example, as described above, the routing service may compute a hash of the bit stream identifier and user identifier. The computed hash value may be used to determine the address of the node to which the bit stream was sent for storage and subsequent storage processing.

The routing service may then consult the local routing table to determine the address (or nearest neighbor address) associated with the hash, and request the bit stream from that address. If the bit stream is still stored in the local cache associated with that stream store service, then the stream store service returns the bit stream in one or more packets to the node that requested it. If the bit stream is not still stored in the local cache associated with that stream store service, then the stream store service computes the hashes associated with the chunks into which the bit stream was decomposed, and requests those chunks from the chunk store services to which those chunks were sent during the storage process.

If a chunk remains in local cache associated with that chunk store service, then that chunk is returned to the node that requested it. If not, then the chunk store service computes the hash associated with the fragments associated with that chunk, and requests those fragments from the nodes on which those fragments were stored.

This process continues—retrieving check blocks to reconstitute the fragments, retrieving fragments to reconstitute the chunks, retrieving chunks to reconstitute the bit stream, until the bit stream is reconstituted and returned to the node that requested it. As described above, the nature of the underlying fabric is that routing to the key will lead the message to the nodes on which the data is stored.

As described above, the bit stream may be divided into a plurality of contiguous check blocks (fragments, chunks). Accordingly, the retrieval process need not retrieve the entire bit stream, and may retrieve only a subset of the check blocks (fragments, chunks). In general, the retrieval process may begin with any check block (fragment, chunk) in the bit stream and end with any other check block (fragment, chunk). To retrieve only a portion of the bit stream, the retrieval service need only determine the addresses associated with the check blocks (fragments, chunks) that make up that portion of the bit stream, and request reconstitution of that portion of the bit stream from those check blocks (fragments, chunks). Because the hashing process works by hashing the identifier of the previous layer and the ordinal number (i.e., offset) of the chunk, that is, the check block in the lower layers, it is possible to find the hash value of any of the pieces.

It is anticipated that a node on which a check block is persisted may no longer be on the network when the data is retrieved (e.g., the data may have been overwritten, deleted, or corrupted; the node may be unavailable at the time the data is requested; the node may have been removed from the network permanently; etc.). Preferably, as described above, the number of check blocks into which each chunk is divided is more than enough to ensure reliable retrieval with a great degree of confidence, even when a number of check blocks are irretrievable. It is also anticipated that one or more nodes may be added to the network between the time the data is stored and the time it is retrieved. If a new node that is closer to the key has been introduced, then, due to the nature of the underlying fabric, a previously existing node (one that existed at the time the data was stored) will realize that the new node has been introduced and that the new node is closer to the data sought to be retrieved. Accordingly, the new node may "push" the appropriate message(s) to the new node in order to continue the process of hopping the message to the node on which the data is stored.

According to an aspect of the invention, a decentralized, peer-to-peer, distributed storage mechanism may be used to store and cache ads, for example, locally, such as in client PCs that reside in the actual country or city where the ads are to be viewed. In this manner, not only may textual or banner ads be stored, but so may rich media (e.g., full motion video plus stereo audio) television-style advertisements, localized to a specific region, neighborhood, or individual.

With regard to digital photo and video storage and sharing, the underlying distributed storage mechanisms may be leveraged to achieve very high reliability and availability of the photos without requiring such massive amounts of redundancy such as in Google's current version of Picasa. This scenario may be particularly important given the increased number of phone-based cameras appearing in the market. Even with a phone-based camera having its own local mass storage, the user may still have problems backing up photos and sharing them electronically. This may be especially interesting in emerging markets where mobile phone usage is exploding due to more ready build-out of a wireless infrastructure.

With regard to video email, the distributed storage model may be leveraged to build a reliable mail delivery system tuned for large-sized video messages. In such a system, the quality problem may be solved because the system is no longer bound by the bandwidth limitations of either the sender or the receiver. It also allows the receipts to be freed from being in the same place at the same time. This scenario may be important in emerging markets where complex scripts make it difficult to type textual messages on a keyboard, and high rates of illiteracy make it difficult to send any type of text message.

Thus, there have been described systems and methods for distributed, decentralized storage and retrieval of data in an extensible SOAP environment. It should be understood that such systems and methods decentralize not only the bandwidth required for data storage and retrieval, but also the computational requirements. That is, such systems and methods alleviate the need for one node to do all the storage and retrieval processing, and no single node is required to send or receive all the data.

It should further be understood that, although the invention has been described in connection with certain preferred embodiments depicted in the various figures, other similar embodiments may be used, and modifications or additions may be made to the described embodiments for practicing the invention without deviating therefrom. For example, when it is being stored, the data may be encrypted, signed, etc., so that the retrieving process can verify that the retrieved data is, in fact, the expected data. The invention, therefore, should not be limited to any single embodiment, but rather should be construed in breadth and scope in accordance with the following claims.

What is claimed:

1. A system comprising:
   a plurality of processor nodes, each one of the plurality of processing nodes comprising storage;
   a distributed hash table comprising a plurality of local routing tables maintained in the plurality of processor nodes, each of the plurality of local routing tables containing hash values corresponding to node addresses of neighboring network nodes;
   a storage service configured to receive a storage request message comprising a bit stream; and
   a routing service configured to receive the bit stream from the storage service, divide the bit stream into a plurality of chunks, compute hash values for each of the plurality of chunks, each hash value based on a concatenation of a bit stream identifier and a user identifier, and transmit into a network a plurality of chunk store messages, the transmitting comprising consulting a local routing table of a first processor node to determine if an address of a recipient processor node corresponds to a neighboring network node of the first processor node, the recipient processor node comprising a chunk store service that divides a received chunk into a plurality of fragments, encodes a fragment into a check block, and transmits the check block to a fragment store service.

2. The system of claim 1, the recipient processor node further comprising:
   a fragment store service that is configured to receive from the chunk store service at least one of the plurality of fragments and store the at least one of the plurality of fragments.

3. The system of claim 1, further comprising a retrieval system configured to retrieve a portion of the stored bit stream by using an offset value associated with a chunk.

4. The system of claim 1, wherein the chunk store service starts a timer when the check block is sent out for storage and, if the chunk store service does not receive a confirmation from the fragment store service that the check block has been stored before the timer expires, the chunk store service attempts to store the fragment elsewhere.

5. The system of claim 1, wherein each of the plurality of processor nodes has a time manager that provides alterable time relative to an absolute system time.

6. The system of claim 1, the routing service further configured to:
   a) specifically direct a first chunk store message to the neighboring network node when a first hash value corresponding to the neighboring network node is present in the local routing table; and
   b) transmit the first chunk store message into the network for hopping through an intermediary network node when the first hash value is not present in the local routing table.

7. The system of claim 1, the storage request message comprising a SOAP message.

* * * * *